3,640,996
DISPERSE WATER-INSOLUBLE BENZENEAZO-3-ACETYL- OR 3-PROPIONYL-AMINODIPHENYL-AMINE DYESTUFFS

Hans-Juergen Sturm, Gruenstadt, and Kurt Mayer, Ludwigshafen, Germany, assignors to Badische Anilin- & Soda-Fabrik Aktiengesellschaft, Ludwigshafen (Rhine), Germany
No Drawing. Filed Feb. 17, 1969, Ser. No. 799,929
Claims priority, application Germany, Feb. 23, 1968, P 17 19 060.2
Int. Cl. C09b 29/08; D06p 1/08, 3/52
U.S. Cl. 260—207.1                      4 Claims

ABSTRACT OF THE DISCLOSURE

Disperse water-insoluble azo dyes in which a diazo component, e.g. of the benzene series, is coupled to 3-acetylamino or 3-propionylamino-diphenylamine as the coupling component; these dyes wherein the nitrogen atom of the diphenylamine is substituted by methyl, ethyl, β-hydroxy-ethyl or -propyl, β-hydroxy-γ-propyl, or β-acetoxy-ethyl or -propyl, when used alone or in mixtures with the corresponding compounds having the unsubstituted nitrogen atom are especially useful for the dispersion dyeing of synthetic linear polyester fibrous materials.

---

This invention relates to new and valuable azo dyes which are insoluble in water and which have the general formula:

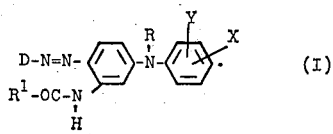

(I)

in which:
D denotes the radical of a diazo component of the benzene, azobenzene, anthraquinone, thiadiazole or benzoisothiazole series;
R denotes a methyl, ethyl, β-hydroxyethyl, β-hydroxypropyl, β-hydroxy-γ-chloropropyl, β-acetoxyethyl or β-acetoxypropyl group;
$R^1$ denotes a methyl or ethyl group;
X denotes a hydrogen, chlorine or bromine atom or a methyl, ethyl or methoxy group; and
Y denotes a hydrogen atom or a methyl group, and to mixtures of such dyes with compounds having the Formula I in which R denotes a hydrogen atom.

D may be derived for example from:

4-nitroaniline,
4-nitro-2-chloroaniline,
4-nitro-2-bromoaniline,
4-nitro-2-methylaniline,
4-nitro-2-cyanoaniline,
4-nitro-2-cyano-6-chloroaniline,
4-nitro-2-methoxyaniline,
2,4-dinitroaniline,
2,4-dinitro-6-chloroaniline,
2,4-dinitro-6-bromoaniline,
2,6-dichloro-4-nitroaniline,
2,6-dibromo-4-nitroaniline,
2-chloro-6-bromo-4-nitroaniline,
4-nitro-2-cyano-6-bromoaniline,
2-methylsulfonyl-4 nitroaniline,
2,4-dibromo-6-cyanoaniline or
2-cyano-5-methoxy-6-bromo-4-nitroaniline.

Aminoazobenzene and substitution products derived therefrom, such as 4-amino-2-methyl-2′,4′-dinitroazobenzene, 4-amino-2′,3′-dichloro-4′-nitroazobenzene, 4-amino-3-chloro-2′-cyano-4′-nitroazobenzene or 1-aminoanthraquinone are also suitable.

Examples of diazotizable heterocyclic amines of the thiadiazole or benzoisothiazole series are:

2-amino-5-phenylthiadiazole-(3,4),
2-amino-4-methylmercaptothiadiazole-(2,4),
2-amino-4-β-carbomethoxyethylmercaptothiadiazole-(2,4),
2-amino-4-β-carboethoxyethylmercaptothiadiazole-(2,4),
3-amino-2,1-benzoisothiazole,
3-amino-5-nitro-2,1-benzoisothiazole,
3-amino-5-nitro-7-bromo-2,1-benzoisothiazole or
3amino-5,7-dibromo-2,1-benzoisothiazole.

Nitroanilines bearing chlorine, bromine and/or cyano as substituents and aminobenzoisothiazoles bearing nitro and/or bromine as substituents are of particular industrial importance.

Examples of radicals of the coupling components are:

3-acetylamino-N-methyldiphenylamine,
3-acetylamino-N-ethyldiphenylamine,
3-acetylamino-N-β-hydroxyethyldiphenylamine,
3-acetylamino-N-β-hydroxypropyldiphenylamine,
3-acetylamino-N-β-acetoxyethyldiphenylamine,
3-acetylamino-N-β-acetoxypropyldiphenylamine,
3-acetylamino-N-β-acetoxyethyl-4′-acetylaminodiphenylamine,
3-propionylamino-N-β-hydroxypropyldiphenylamine,
3-propionylamino-N-β-hydroxyethyldiphenylamine,
3-acetylamino-N-methyl-4′-chlorodiphenylamine,
3-acetylamino-N-β-hydroxyethyl-4′-chlorodiphenylamine,
3-acetylamino-N-β-hydroxyethyl-4′-methyldiphenylamine,
3-acetylamino-N-β-hydroxyethyl-4′-methoxydiphenylamine,
3-acetylamino-N-β-hydroxyethyl-2′,4′-dimethyldiphenylamine,
3-acetylamino-N-β-hydroxypropyl-4′-methyldiphenylamine,
3-acetylamino-N-β-hydroxypropyl-4′-chlorodiphenylamine,
3-acetylamino-N-β-hydroxypropyl-4′-acetylaminodiphenylamine,
3-propionylamino-N-β-hydroxyethyl-4′-methoxydiphenylamine,
3-propionylamino-N-β-hydroxyethyl-4′-methyldiphenylamine,
3-propionylamino-N-β-hydroxyethyl-2′,4′-dimethyldiphenylamine,
3-acetylamino-N-methyl-4′-methyldiphenylamine,
3-acetylamino-N-β-hydroxy-γ-chloropropyldiphenylamine,
3-acetylamino-N-β-hydroxy-γ-chloropropyl-4′-methyldiphenylamine,
3-acetylamino-N-β-hydroxy-γ-chloropropyl-4′-chlorodiphenylamine,
3-acetylamino-N-β-hydroxy-γ-chloropropyl-4′-acetylaminodiphenylamine and
3-acetylamino-N-β-hydroxyethyl-4′-acetylaminodiphenylamine.

Mixtures of a compound having the following Formula III and a compound having the following Formula IV bearing the same substituents are particularly suitable mixtures of the compounds having the Formulae III and IV.

Dyes which are of particular industrial value are those having the general formula:

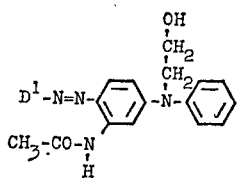

in which D¹ denotes the radical of a chloro, bromo and/or cyano substituted nitroaniline or the radical of a nitro and/or bromo substituted benzoisothiazole and mixtures of such dyes with those having the general formula:

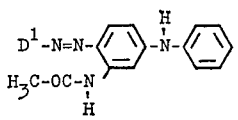

The new dyes may be obtained for example by reaction of a diazo compound of an amine having the Formula II:

$$DNH_2 \qquad (II)$$

with a coupling component having the Formula III:

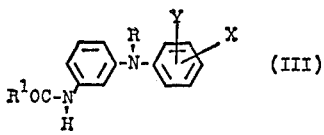

or with mixtures of compounds having the Formula III with compounds having the Formula IV:

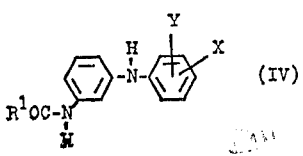

The new dyes are eminently suitable, especially in finely divided form, for dyeing structures such as fibers, filaments, threads, flock, woven and knitted fabrics, particularly of polyesters, for example polyethylene terephthalate or polyesters based on terephthalic acid and 1,4-dimethylolcyclohexane. Cellulose esters and polyamides may also be dyed with these dyes.

Particularly the mixtures of dyes according to this invention give bright dyeings of high tinctorial strength. Dyeing methods may include not only high temperature dyeing and the thermosol method, but also dyeing with carriers.

The invention is illustrated by the following examples, in which the parts and percentages are by weight.

EXAMPLE 1

6.05 parts of 2-chloro-4-nitroaniline is stirred with 32 parts of water and 32 parts of concentrated hydrochloric acid. One hour later a solution of sodium nitrite in 7 parts of water is added at from 0° to 5° C. After another half an hour, the diazonium salt solution obtained is added to a solution of 5 parts of 3-acetylamino-4'-chlorodiphenylamine and 6 parts of 3-acetylamino-4'-chloro-N-(β-hydroxyethyl)-diphenylamine in 100 parts of N-methylpyrrolidone and 150 parts of methyl alcohol. When coupling is over (after about on hour) the deposited dye is suction filtered, washed with water until neutral and dried. 14.5 parts of a dye mixture is obtained consisting of half each of the two compounds having the formula:

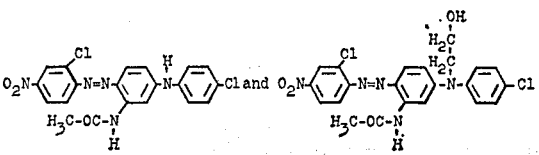

Red dyeings are obtained therewith on polyester fibers.

EXAMPLE 2

8.46 parts of 2-amino-3-bromo-5-nitrobenzonitrile is added in portions at from 0° to 5° C. to a mixture of 40 parts of 85% sulfuric acid and 11 parts of nitrosylsulfuric acid which contains 2.52 parts of sodium nitrite. The whole is stirred for four hours at 0° to 5° C. The diazonium salt solution thus obtained is allowed to flow into a cooled solution of 9.6 parts of 3-acetylamine-N-(β-hydroxyethyl)-diphenylamine in 150 parts of glacial acetic acid and 180 parts of water. Another hour later, the deposited dye is suction filtered, washed with water until it is neutral and dried. 9.5 parts of the compound having the formula:

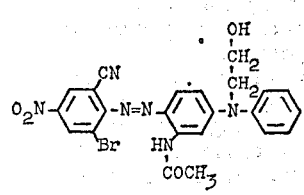

is obtained. It dyes polyester fibers bright blue shades having very good tinctorial properties.

EXAMPLE 3

8.46 parts of 2-amino-3-bromo-5-nitrobenzonitrile is diazotized as in Example 2. The resulting diazonium salt solution is diluted at from 0° to 5° C. with 40 parts of glacial acetic acid and then added to the cooled coupling solution. The coupling solution contains 3.3 parts of 3-acetylaminodiphenylamine and 5.9 parts of 3-acetyl-amino-N-β-hydroxyethyldiphenylamine in 90 parts of methanol and 90 parts of water. After all the diazonium salt solution has been added, the temperature is kept for half an hour at 0° to 5° C., the deposited dye is suction filtered, washed until it is neutral and dried. 15 parts of a dye mixture is obtained which consists of 40% of the compound having the formula:

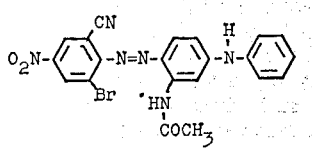

and 60% of the compound having the formula:

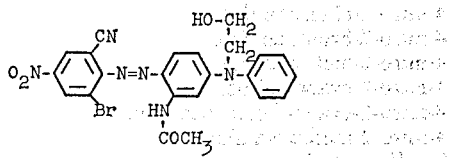

Blue dyeings are obtained on polyesters with the dye mixture.

EXAMPLE 4

6.83 parts of 3-amino-5-nitro-2,1-benzoisothiazole is introduced in portions at 10° to 15° C. into 27 parts of concentrated sulfuric acid. As soon as the amine has dissolved, the whole is cooled to 5° C. and 35 parts of a mixture of glacial acetic acid and propionic acid (17:3)

is gradually added. Nitrosylsulfuric acid prepared from 2.52 parts of sodium nitrite and 9 parts of concentrated sulfuric acid is then added slowly at from 0° to 5° C. and the whole stirred for three hours at from 0° to 5° C. The diazonium salt solution is then added to a cooled solution of 2.8 parts of 3-acetylamino-4'-methyldiphenylamine and 6.5 parts of 3-acetylamino-4'-methyl-N-methyldiphenylamine in 50 parts of N-methylpyrrolidone and 120 parts of methanol. The temperature is kept at 0° to 5° C. for half an hour, the deposited dye is suction filtered, washed with water until it is neutral and then dried. 11.5 parts of a dye mixture consisting of 30% of the compound having the formula:

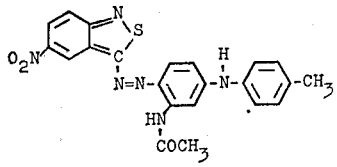

and 70% of the compound having the formula

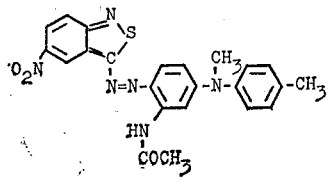

is obtained. Blue dyeings are obtained therewith on polyester fibers or cloths.

EXAMPLE 5

60 parts of 85% phosphoric acid is added in the course of ninety minutes at 0° to 5° C. to a mixture of 10 parts of concentrated sulfuric acid and 10.5 parts of nitrosylsulfuric acid which has been prepared from 2.5 parts of sodium nitrite and 8 parts of concentrated sulfuric acid. Then, at from 0° to 5° C., 6.28 parts of 2-amino-5-phenylthiadiazole-(1,3,4) is introduced into this mixture. The temperature is kept at from 0° to 5° C. for three hours and then the diazonium salt solution obtained is added to a cooled solution of 12 parts of 3-acetamino-N-β-hydroxyethyldiphenylamine in 100 parts of N-methylpyrrolidone and 45 parts of glacial acetic acid. The whole is stirred for half an hour at from 0° to 5° C., 50 parts of water and 40 parts of methyl alcohol are added and the deposited dye is suction filtered, washed and dried. 12 parts of the dye having the formula:

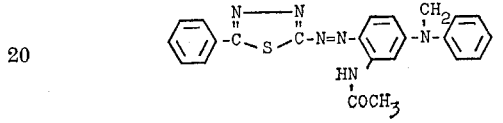

is obtaine which dyes polyester cloth red violet shades.

The following table contains further examples using dyes having the general formula:

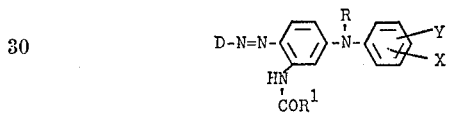

in which D, $R^1$, R, X and Y have the meanings given in the table in which Ex=Example No. and Color=Color of the dyeing on polyester Me=$CH_3$; Et=$C_2H_5$

TABLE

| Example | D | $R^1$ | R | X | Y | Color |
|---|---|---|---|---|---|---|
| 6 | 4-nitrophenyl | Me | 50% H, 50% $C_2H_4OH$ | 4-Cl | H | Red. |
| 7 | 2-chloro-4-nitrophenyl | Me | 30% H, 70% $C_2H_4OH$ | 4-Me | H | Red. |
| 8 | 2-methoxy-4-nitrophenyl | Me | 30% H, 70% $C_2H_4OH$ | 4-Me | H | Red. |
| 9 | 2-cyano-4-nitrophenyl | Me | 55% H, 45% $C_2H_4OH$ | H | H | Violet. |
| 10 | do | Me | 30% H, 70% $C_2H_4OH$ | 4-OMe | H | Blue violet. |
| 11 | do | Me | 55% H, 45% $C_2H_4OH$ | 4-Me | H | Violet. |
| 12 | do | Me | 40% H, 60% $C_2H_4OH$ | 4-Cl | H | Red violet. |
| 13 | 2,4-dinitrophenyl | Me | 50% H, 50% $C_2H_4OH$ | 4-Me | H | Violet. |
| 14 | 2-cyanophenyl | Me | 50% H, 50% $C_2H_4OH$ | 4-Me | H | Orange red. |
| 15 | 4-phenylazophenyl | Me | 40% H, 60% $C_2H_4OH$ | H | H | Red. |
| 16 | 2,6-dichloro-4-nitrophenyl | Me | 50% H, 50% $C_2H_4OH$ | H | H | Ruby. |
| 17 | 2-chloro-6-bromo-4-nitrophenyl | Me | 40% H, 60% $C_2H_4OH$ | 4-OMe | H | Do. |
| 18 | 2,6-dibromo-4-nitrophenyl | Me | 50% H, 50% $C_2H_4OH$ | H | H | Red brown. |
| 19 | do | Me | 20% H, 80% $C_2H_4OH$ | 4-Me | H | Ruby. |
| 20 | do | Me | 50% H, 50% $C_2H_4OH$ | 4-Cl | H | Red brown. |
| 21 | 2,4-dinitro-6-bromophenyl | Me | 50% H, 50% $C_2H_4OH$ | H | H | Blue. |
| 22 | do | Me | 35% H, 65% $C_2H_4OH$ | 4-Me | H | Do. |
| 23 | 2-cyano-6-bromo-4-nitrophenyl | Me | 20% H, 80% $C_2H_4OH$ | 4-OMe | H | Do. |
| 24 | do | Me | $C_2H_4OH$ | 4-Me | H | Do. |
| 25 | do | Me | 30% H, 70% $C_2H_4OH$ | 4-Cl | H | Do. |
| 26 | do | Me | Me | H | H | Do. |
| 27 | do | Me | 50% H, 50% Me | 4-Me | H | Do. |
| 28 | 2,4-dinitro-6-bromophenyl | Me | $C_2H_4OH$ | H | H | Blue violet. |
| 29 | 2,6-dibromo-4-nitrophenyl | Me | $C_2H_4OH$ | H | H | Ruby. |
| 30 | 2,4-dinitro-6-cyanophenyl | Me | 40% H, 60% $C_2H_4OH$ | 4-Me | H | Red violet. |
| 31 | do | Me | 50% H, 50% $C_2H_4OH$ | H | H | Do. |
| 32 | 2-methylsulfone-4-nitrophenyl | Me | 60% H, 40% $C_2H_4OH$ | H | H | Bluish red. |
| 33 | 5-nitrobenzoisothiazolyl-(3) | Me | $C_2H_4OH$ | 4-Me | H | Blue. |
| 34 | do | Me | 30% H, 70% $C_2H_4OH$ | H | H | Do. |
| 35 | do | Me | 40% H, 60% $C_2H_4OH$ | 4-Cl | H | Do. |
| 36 | do | Me | 20% H, 80% $C_2H_4OH$ | 4-OMe | H | Do. |
| 37 | Benzoisothiazolyl-(3) | Me | $C_2H_4OH$ | 4-Me | H | Reddish blue. |
| 38 | 5,7-dibromobenzoisothiazolyl-(3) | Me | 50% H, 50% $C_2H_4OH$ | H | H | Blue. |
| 39 | do | Me | 40% H, 60% $C_2H_4OH$ | 4-Me | H | Do. |
| 40 | do | Me | 50% H, 50% $C_2H_4OH$ | 4-Cl | H | Do. |
| 41 | 5-nitro-7-bromobenzoisothiazolyl-(3) | Me | $C_2H_4OH$ | 4-Me | H | Blue green. |
| 42 | do | Me | 50% H, 50% $C_2H_4OH$ | 4-Cl | H | Blue. |
| 43 | 5-nitrobenzoisothiazolyl-(3) | Me | 40% H, 60% Me | H | H | Do. |
| 44 | Benzoisothiazolyl-(3) | Me | 50% H, 50% Me | H | H | Do. |
| 45 | 2-cyano-6-bromo-4-nitrophenyl | Me | 40% H, 60% Et | H | H | Do. |
| 46 | 5-nitrobenzoisothiazolyl-(3) | Me | 50% H, 50% Et | H | H | Do. |
| 47 | 2-cyano-6-bromo-4-nitrophenyl | Me | 40% H, 60% $C_2H_4OH$ | 4-Me | 2-Me | Do. |
| 48 | 5-nitro-7-bromobenzoisothiazolyl-(3) | Me | 40% H, 60% $C_2H_4OH$ | 4-Me | 2-Me | Blue green. |
| 49 | 2-cyano-6-bromo-4-nitrophenyl | Me | 20% H, 80% $CH_2$-CHOHMe | 4-Me | H | Blue. |
| 50 | 5-nitrobenzoisothiazolyl-(3) | Me | 20% H, 80% $CH_2$-CHOHMe | 4-Me | H | Do. |
| 51 | 2-cyano-6-bromo-4-nitrophenyl | Et | 60% H, 40% $C_2H_4OH$ | 4-Me | 2-Me | Do. |

TABLE.—Continued

| Example | D | R¹ | R | X | Y | Color |
|---|---|---|---|---|---|---|
| 52 | 2,4-dinitro-6-bromophenyl | Et | 60% H, 40% C₂H₄OH | 4-Me | 2-Me | Blue violet. |
| 53 | 2-cyano-6-bromo-4-nitrophenyl | Et | 50% H, 50% C₂H₄OH | 4-Me | H | Blue. |
| 54 | 2-chloro-4-nitrophenyl | Et | 30% H, 70% C₂H₄OH | 4-OMe | H | Red violet. |
| 55 | 2-cyano-6-bromo-4-nitrophenyl | Et | 30% H, 70% C₂H₄OH | 4-OMe | H | Blue. |
| 56 | do | Me | 40% H, 60% CH₂CHOH-CH₂Cl | H | H | Do. |
| 57 | 2-chlor-4-nitrophenyl | Me | 40% H, 60% CH₂CHOH-CH₂Cl | H | H | Do. |
| 58 | 2-cyano-6-bromo-4-nitrophenyl | Me | 100%, 60% CH₂CHOH-CH₂Cl | 4-Me | H | Do. |
| 59 | 5-nitrobenzoisothiazolyl-(3) | Me | 20% H, 80% CH₂CHOH-CH₂Cl | 4-Me | H | Greenish blue |
| 60 | 2-chloro-4-nitrophenyl | Me | 40% H, 60% C₂H₄OCOMe | H | H | Red. |
| 61 | 2-cyano-6-bromo-4-nitrophenyl | Me | 40% H, 60% C₂H₄OCOMe | H | H | Blue. |
| 62 | 5-nitrobenzoisothiazolyl-(3) | Me | 10% H, 90% C₂H₄OCOMe | H | H | Do. |
| 63 | 5-nitro-7-bromobenzoisothiazolyl-(3) | Me | 10% H, 90% C₂H₄OCOMe | H | H | Do. |
| 64 | 5,7-dibromobenzoisothiazolyl-(3) | Me | C₂H₄OCOMe | H | H | Do. |
| 65 | 2-cyano-6-bromo-4-nitrophenol | Me | 30% H, 70% CH₂CHOH-Me | H | H | Do. |
| 66 | do | Me | CH₂—CHOH-CH₂Cl | 4-Cl | H | Do. |
| 67 | 5-nitrobenzoisothiazolyl-(3) | Me | 10% H, 90% CH₂CHOH-CH₂Cl | 4-Cl | H | Do. |
| 68 | 5-nitro-7-bromobenzoisothiazolyl-(3) | Me | 10% H, 90% CH₂CHOH-CH₂Cl | 4-Cl | H | Do. |
| 69 | 2-cyano-6-bromo-4-nitrophenyl | Me | 30% H, 70% CH₂—CHOH-CH₂Cl | 4-Cl | H | Do. |
| 70 | 5-nitrobenzoisothiazolyl-(3) | Me | 60% H, 40% CH₂CHOH-CH₂Cl | 4-Cl | H | Do. |
| 71 | 5-nitro-7-bromobenzoisothiazolyl-(3) | Me | 50% H, 50% CH₂CHOH-CH₂Cl | 4-Cl | H | Do. |
| 72 | 1-anthraquinonyl | Me | 40% H, 60% C₂H₄OH | H | H | Red brown. |

We claim:

1. A dye having the formula

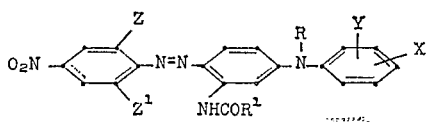

in which:
Z denotes hydrogen, chlorine, bromine, cyano or nitro;
Z¹ denotes hydrogen, chlorine or bromine;
R denotes methyl, ethyl, β-hydroxyethyl, β-hydroxypropyl, β-hydroxy-γ-chloropropyl, β-acetoxyethyl or β-acetoxypropyl;
R¹ denotes methyl or ethyl;
X denotes hydrogen, chlorine, bromine, methyl, ethyl or methoxy; and
Y denotes hydrogen or methyl.

2. A dye as claimed in claim 1 in admixture with the same compound of the Formula I but in which R is hydrogen.

3. A dye as claimed in claim 1 wherein R is β-hydroxyethyl, R¹ is methyl and X and Y each represent hydrogen.

4. A dye as claimed in claim 1 of the formula

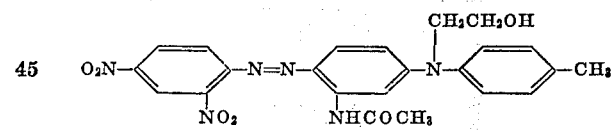

References Cited

UNITED STATES PATENTS

| | | | |
|---|---|---|---|
| 2,083,308 | 6/1937 | Senn | 260—207.1 X |
| 2,289,349 | 7/1942 | Dickey et al. | 260—207.1 X |
| 2,683,709 | 7/1954 | Dickey et al. | 260—158 |
| 2,730,523 | 1/1956 | Dickey et al. | 260—158 |
| 2,857,371 | 10/1958 | Staley et al. | 260—158 X |
| 2,889,315 | 6/1959 | Bossard et al. | 260—158 X |
| 3,438,963 | 4/1969 | Robbins | 260—157 |
| 3,455,898 | 7/1969 | Seefelder et al. | 260—158 |

FLOYD D. HIGEL, Primary Examiner

U.S. Cl. X.R.

8—4, 41 R, 41 B, 41 C, 50; 117—138.8 R, 138.8 F, 144; 260—37 N, 40 R, 158, 187, 192, 207